July 27, 1971   N. GOLD   3,595,661

PHOTOGRAPHIC FILM ASSEMBLAGE

Filed Dec. 16, 1968   2 Sheets-Sheet 1

INVENTOR.
NICHOLAS GOLD

BY Brown and Mikulka
and
Alfred E. Corrigan
ATTORNEYS

July 27, 1971 N. GOLD 3,595,661
PHOTOGRAPHIC FILM ASSEMBLAGE
Filed Dec. 16, 1968 2 Sheets-Sheet 2

INVENTOR.
NICHOLAS GOLD
BY
Brown and Mikulka
and
Alfred E. Corrigan
ATTORNEYS

United States Patent Office 3,595,661
Patented July 27, 1971

3,595,661
PHOTOGRAPHIC FILM ASSEMBLAGE
Nicholas Gold, Arlington, Mass., assignor to Polaroid Corporation, Cambridge, Mass.
Filed Dec. 16, 1968, Ser. No. 784,161
Int. Cl. G03b 17/26; G03c 3/00
U.S. Cl. 96—76                7 Claims

ABSTRACT OF THE DISCLOSURE

A photographic film assemblage including a container having a wall with a light-transmitting section therein and a plurality of film units, each including a photosensitive area surrounded by a margin, stacked within the container, with the photosensitive areas located in alignment with the light-transmitting section. A support member is provided for engaging and supporting the film unit furthest from the light-transmitting section only at margins of the film unit and urging the film unit nearest the light-transmiting section against the wall in position for exposure to light transmitted through the light-transmitting section.

---

The present invention is concerned with improvements in photographic film assemblages or packs of the type including a container and a plurality of photosensitive elements or film units adapted to be exposed, in sequence, within the container and withdrawn therefrom following exposure. The container is provided with an elongated opening in one end thereof dimensioned to permit the passage of the film units therethrough and a forward wall having a light-transmitting section. The film units are stacked within the container with the leading end of each film unit positioned adjacent an end wall and with a forwardmost film unit positioned with its photosensitive surface facing in the direction of said forward wall in position for exposure to light transmitted through said light-transmitting section and its end in alignment with said elongated opening. Support means are provided for supporting the film unit furthest from the light-transmitting section and for urging the film units toward the light-transmitting section. However, it has been found that image-forming characteristics, such as sensitivity of the photosensitive, image-recordng medium, e.g., a gelatn silver halide emulsion, employed in the aforementioned film units may be altered adversely when the film units are non-uniformly supported in the area of the recording medium subjected to image-forming exposure, i.e., when the film unit is supported over only a portion of the area to be exposed. When this exposure area of the film unit is non-uniformly supported, e.g., when it is supported by a platen having openings therein, there may be created a variance or inconsistency in the sensitivity of the recording medium due to the resultant variation in the ambient conditions, due for example, to differences in compressive pressure exerted on the recording medium and in spacing between the photosensitive recording medium and another layer of the film unit such as an image-receiving layer occurring across the boundary between supported and nonsupported areas. One object of the invention is to provide, in a photographic film assemblage of the type set forth above, including film units each having an area containing an image-recording medium, means for providing uniform ambient conditions for said area.

Another object of the invention is to provide, in a photo graphic film assemblage of the type set forth above including film units each having a photosensitive area having margins on at least two sides, means for supporting a film unit only at its margins.

Further, the thickness of the aforementioned film unit varies from a maximum near its leading edge to a minimum between its leading and trailing edges to an intermediate value near its trailing edge. Therefore, another object of the invention is to provide in a film assemblage of the foregoing type including a container having a planar forward wall with an exposure aperture therein and a plurality of stacked film units, each of which has a non-uniform thickness, resilient support means for engaging and substantially conforming to the margins of the film unit furthest from said exposure aperture to support the forwardmost film unit against the forward wall in alignment with said exposure aperture.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
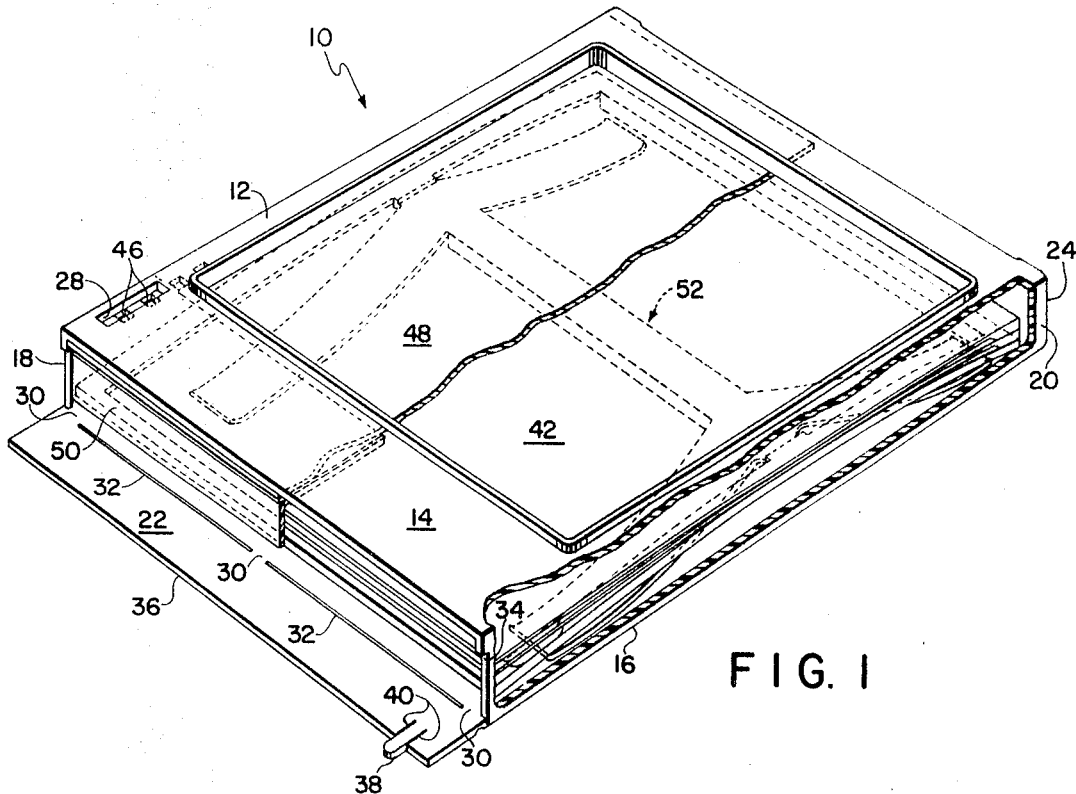
FIG. 1 is a perspective view, partly in section, of the film assemblage of the instant invention.
Figure 3:
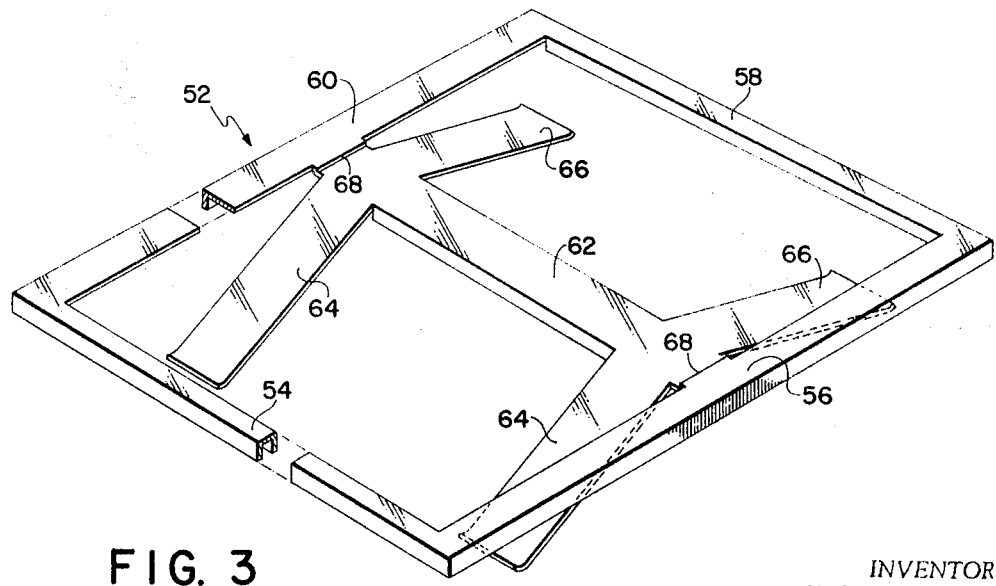
FIG. 3 is a perspective view, partly in section, of one of the components of the film assemblage of FIG. 1.
Figure 2:
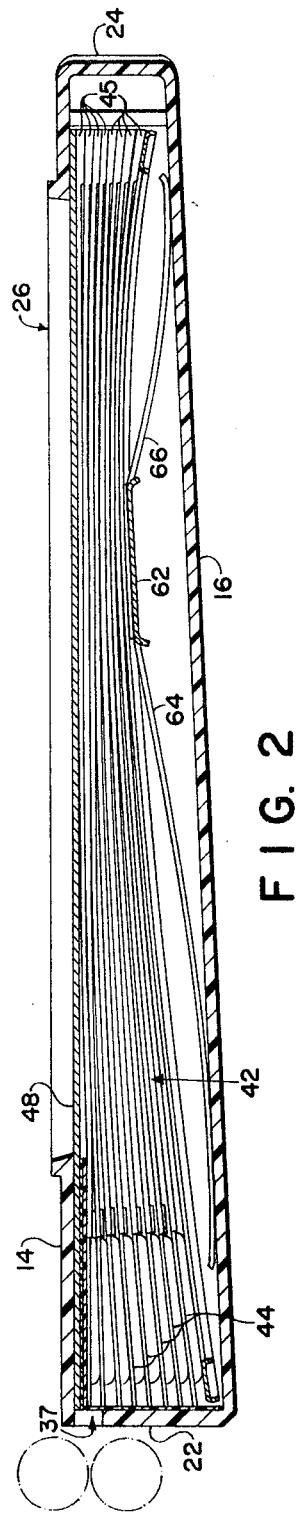
FIG. 2 is a side view, partly in section, of the film assemblage of FIG. 1 with the end wall of the container shown in its closed position.

Reference is now made to FIGS. 1 and 2 of the drawings wherein is illustrated the film assemblage or pack of the instant invention denoted generally by reference numeral 10. Film assemblage 10 includes a container 12, made from any suitable opaque material, having a generally planar forward wall 14, a rear wall 16, side walls 18, 20 and end walls 22, 24. Forward wall 14 has a light-transmitting section or exposure aperture 26 and an elongated slot 28 therein for receiving means for moving a film unit from the container 12. End wall 22, which is shown in FIG. 1 in a position just prior to its being folded ninety degrees against the ends of walls 18 and 20 and sealed thereto as shown in FIG. 2, is attached to the rear wall 16 by integral hinge means comprised of a plurality of sections 30 interrupted by narrow elongated openings 32, said openings being sealed after the wall has been moved to the position shown in FIG. 2. In the folded position, end wall 22 fits within recessed portions 34 in the ends of side walls 18, 20 and edge 36 of wall 22 cooperates with an end of forward wall 14 to define a withdrawal slot 37 through which a film unit may be moved subsequent to exposure. End wall 22 further includes as an integral part thereof an extension 38 which extends from edge 36 partly across the withdrawal slot 37 to prevent the movement of more than one film unit at a time through said withdrawal slot. Extension 38 is provided with a slit 40 along each side thereof to increase its resiliency.

Positioned within the container 12 are a plurality of film units 42, only two of which are shown in FIG. 1, of the type shown and described in detail in U.S. pat. application of Edwin H. Land, Ser. No. 622,287 and Edwin H. Land et al., Ser. No. 622,286, both filed Mar. 10, 1967. Film units of this type each include all of the materials necessary to produce a positive photographic print including a photosensitive element, an image-receiving element which is transparent and is secured in face-to-face relation with the photosensitive element and a rupturable container 44 of processing liquid secured to the leading ends of the photosensitive and image-receiving elements for dispensing its liquid contents therebetween in response to the application of compressive pressure to the container 44. Each film unit is adapted to be processed by advancing the film unit with container 44 foremost, between a pair of pressure-applying members, e.g., rolls, which dispense the liquid contents of the container 44 therefrom between the photosensitive and image-receiving elements and spread the liquid between and in contact with the two elements toward the trailing edge thereof. Each film unit is provided near one lateral edge thereof with a plurality of apertures (not shown), some of which are in alignment with slot 28, which are adapted to receive means in the camera or other apparatus for cooperating with the apertures to move the film unit from the container 12 via the aforementioned withdrawal slot 37. At this point it should be noted that the thickness of each film unit varies from the leading end portion, i.e., container 44, toward the trailing end portion. The leading end of the film unit is of maximum thickness because of container 44; the trailing end is of an intermediate thickness due in part to the traps 45 provided thereat to collect any surplus processing liquid; and the portion therebetween including the exposure area is of a minimum thickness. Accordingly, the end of container 12 having withdrawal opening 37 is of a greater thickness or depth than the opposite end of the container, i.e., the container is tapered with walls 14, 16 converging toward wall 24.

Positioned between the film unit 42 located adjacent the light-transmitting section or exposure aperture 26 and forward wall 14 is a safety cover in the form of an opaque sheet of relatively rigid material 48 and a flexible skirt 50. Sheet 48 is substantially coextensive with forward wall 14 and includes a plurality of apertures 46 for receiving means for moving the safety cover through slot 37. Flexible skirt 50 is made from any suitable material, e.g., polyethylene, which is opaque and is secured to the underside of sheet 48. Section 50 extends across withdrawal opening 37 and apertures 46 to prevent the admission of light through said opening and apertures.

Positioned between the wall 16 and the film unit located adjacent wall 16 is a platen-like, support member 52 for supporting and urging the film units into position for exposure adjacent forward wall 14. Support member 52, which is formed from any suitable resilient material such as spring steel, includes edge portions 54, 56, 58, 60 in the form of a rectangle surrounding a generally H-shaped member comprised of an intermediate member 62 having first and second pairs of legs 64, 66 in the form of cantilever springs extending therefrom. Edge portions 56 and 60, which engage the lateral margins of a film unit, are generally L-shaped in cross section while edge portions 54, 58, which engage the margins of the film unit located adjacent the film units leading and trailing edges, respectively, are generally U-shaped in cross section. Intermediate member 62 includes depressed portions 68 for locating it in a plane spaced from a plane containing said edge portions 54, 56, 58, 60 in order to insure that no portion of support member 52 comes into contact with a medial portion of a film unit. As mentioned above, it has been found that if the medial portion of the film unit, including the area of the photosensitive element which is adapted to be exposed and processed, is not evenly supported throughout its entire area, the quality of the visible, transfer image is adversely affected. This is due to the difference in ambient conditions which are a function of compressive pressure exerted on the photosensitive element and the distance between the photosensitive and image-receiving elements in the region of the exposure and image areas thereof. The material comprising the medial portion of each film unit is sufficiently stiff to maintain itself without support in the focal plane of the camera.

As stated above, legs 64 and 66 cooperate with edge portions 56 and 60 to support the stacked film units as shown in FIG. 2. In order that the force required to remove the first film unit from the container will not be substantially greater than that of the subsequent units, a low change in spring force is desired of legs 64 and 66.

Therefore, the legs 64 and 66 are made as long as the available space and material allows. Also, the load should be distributed so as not to deform or collapse containers 44 and thereby impair the system's ability to process successive film units consistently. As can be seen in FIG. 2, the H-shaped segment is attached to edge portions 56, 60 at a point that is closer to edge portion 58 than edge portion 54. This nonsymmetrical attachment of the H-shaped spring segment allows the edge portions 56 and 60 to conform more readily to the shape of the stacked film units and proportionally reduces the force at edges of containers 44 by virtue of the longer length of sides 56 and 60 toward the container end of the film units. The greater prebend of legs 64 is used to compensate for the taper of the container 12.

Edge portions 54 and 58, which are relatively rigid due to their U-shaped configuration, provide transverse support for the film units near their leading and trailing edges, respectively, and allow for simplified loading of the units into the container. Edge portions 56, 60, despite having an L-shaped configuration in cross section, are sufficiently resilient to conform to the configuration of the bottom of the stack of film units as can be seen in FIG. 2.

Although there has been disclosed a platen-like member having four supporting edge portions, it should be understood that adge portions 54 and 58 could be eliminated and the film units supported only at their lateral margins, i.e., those margins which are parallel with the direction of movement of a film unit through said withdrawal opening 37.

From the foregoing it should be apparent that there has been disclosed a novel photographic film assemblage wherein a film unit is supported only at margins thereof so as to maintain substantially constant the ambient conditions which exist over the area of the media portion of the photosensitive element which is exposed and processed to produce an image. The above is accomplished by a spring-like platen which is formed from a single sheet of resilient material, is relatively inexpensive and uses a minimum of material.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination:

a container having a withdrawal opening at one end and including a forward wall having a light-transmitting section therein;

a plurality of film units each having a medial portion at least coextensive with said light-transmitting section and adapted to be exposed therethrough and end and lateral margins surrounding said medial portion, said opening being dimensioned to permit the passage of said film units therethrough, said film units being arranged in stacked relation within said container with the foremost of said film units located against said forward wall in alignment with said withdrawal opening in position to move therethrough and said medial portions aligned with said light-transmitting section;

support means including edge portions located forwardly of all other portions of said support means, said edge portions including lateral edge portions extending in the direction of movement of said film units through said withdrawal opening, for engaging the rearmost film unit at least at the lateral margins thereof and only at margins thereof;

said support means further including resilient portions located to the rear of said edge portions for urging said edge portions forwardly toward said light-transmitting section to support the foremost film unit against said forward wall in position for exposure to light transmitted through said light-transmitting section.

2. A photographic film assemblage as defined in claim 1 wherein said lateral edge portions are substantially equal in length to said film units and engage said lateral margins of the rearmost film unit substantially from end to end thereof.

3. A photographic film assemblage as defined in claim 1 wherein said lateral edge portions are resiliently deformable.

4. A photographic film assemblage as defined in claim 1 wherein said resilient portions are in the form of cantilever springs formed as integral parts of said support means and extend from a position adjacent and to the rear of said edge portions toward the rear of said container.

5. A photographic film assemblage as defined in claim 4 wherein each of said film units includes a container of processing liquid located near said one end of the first-mentioned container and said springs include first and second pairs of legs, said legs of said first pair extend toward said withdrawal opening and are longer than said legs of said second pair, the latter extending away from said withdrawal opening.

6. A photographic film assemblage as defined in claim 4 wherein said support means includes an intermediate member connected at its ends to said lateral edge portions intermediate the ends thereof and located to the rear of said edge portions so as to be out of contact with said medial portion of the rearmost film unit and said springs include two pairs of legs extending from said intermediate member rearwardly and toward opposite ends of said container.

7. A photographic film assemblage as defined in claim 6 wherein said legs and said intermediate member present an H-shaped configuration and said edge portions include transverse portions connecting the ends of said lateral edge portions to present a rectangular configuration surrounding said legs and said intermediate member.

References Cited

UNITED STATES PATENTS

| | | | |
|---|---|---|---|
| 1,933,823 | 11/1933 | Nagel | 95—66 |
| 2,978,971 | 4/1961 | Eburn | 95—13 |
| 3,309,201 | 3/1967 | Friedman | 96—3 |
| 3,405,618 | 11/1968 | Land | 95—13 |
| 3,426,664 | 2/1969 | Norton | 95—13 |

WILLIAM D. MARTIN, Primary Examiner

W. R. TRENOR, Assistant Examiner

U.S. Cl. X.R.

95—13, 19, 68